(12) United States Patent
Breer et al.

(10) Patent No.: US 11,605,253 B2
(45) Date of Patent: Mar. 14, 2023

(54) METHOD FOR SECURING A COMMUNICATION BETWEEN A MOBILE COMMUNICATION APPARATUS AND A VEHICLE

(71) Applicant: Huf Hülsbeck & Fürst GmbH & Co. KG, Velbert (DE)

(72) Inventors: Jan Breer, Essen (DE); Matthias Maschlanka, Rees (DE); Julia Möller, Velbert (DE); Marc Feldsieper, Hattingen (DE); Fabian Lanze, Düsseldorf (DE)

(73) Assignee: Huf Hülsbeck & Fürst GmbH & Co. KG, Velbert (DE)

( * ) Notice: Subject to any disclaimer, the term of this patent is extended or adjusted under 35 U.S.C. 154(b) by 81 days.

(21) Appl. No.: 17/253,245

(22) PCT Filed: Jun. 27, 2019

(86) PCT No.: PCT/EP2019/067146
§ 371 (c)(1),
(2) Date: Dec. 17, 2020

(87) PCT Pub. No.: WO2020/002499
PCT Pub. Date: Jan. 2, 2020

(65) Prior Publication Data
US 2021/0264705 A1 Aug. 26, 2021

(30) Foreign Application Priority Data
Jun. 29, 2018 (DE) ..................... 10 2018 115 851.3

(51) Int. Cl.
| | | |
|---|---|---|
| G07C 9/00 | (2020.01) | |
| H04L 9/08 | (2006.01) | |
| H04L 9/32 | (2006.01) | |
| H04W 12/63 | (2021.01) | |

(52) U.S. Cl.
CPC ........ *G07C 9/00309* (2013.01); *H04L 9/0869* (2013.01); *H04L 9/3273* (2013.01); *H04W 12/63* (2021.01); *G07C 2009/00396* (2013.01); *G07C 2009/00412* (2013.01); *G07C 2009/00769* (2013.01); *G07C 2209/63* (2013.01); *H04L 2209/80* (2013.01); *H04L 2209/84* (2013.01)

(58) Field of Classification Search
None
See application file for complete search history.

(56) References Cited

U.S. PATENT DOCUMENTS 8,848,915 B2 * 9/2014 Park ...................... H04W 12/50
713/168
2008/0109880 A1 5/2008 Shiu et al.
(Continued)

FOREIGN PATENT DOCUMENTS

| DE | 102017103187 A1 | 8/2017 |
|---|---|---|
| EP | 2979401 A1 | 2/2016 |

*Primary Examiner* — Carlos Garcia
(74) *Attorney, Agent, or Firm* — Bret E. Field; Bozicevic, Field & Francis LLP

(57) ABSTRACT

The invention relates to a method (100) for securing a communication between a mobile communication apparatus (10) and a vehicle (5), in particular for authentication at a passive access system of the vehicle (5), wherein the vehicle (5) comprises at least one radio unit (20).

20 Claims, 3 Drawing Sheets

(56) References Cited

U.S. PATENT DOCUMENTS

Figure 1:
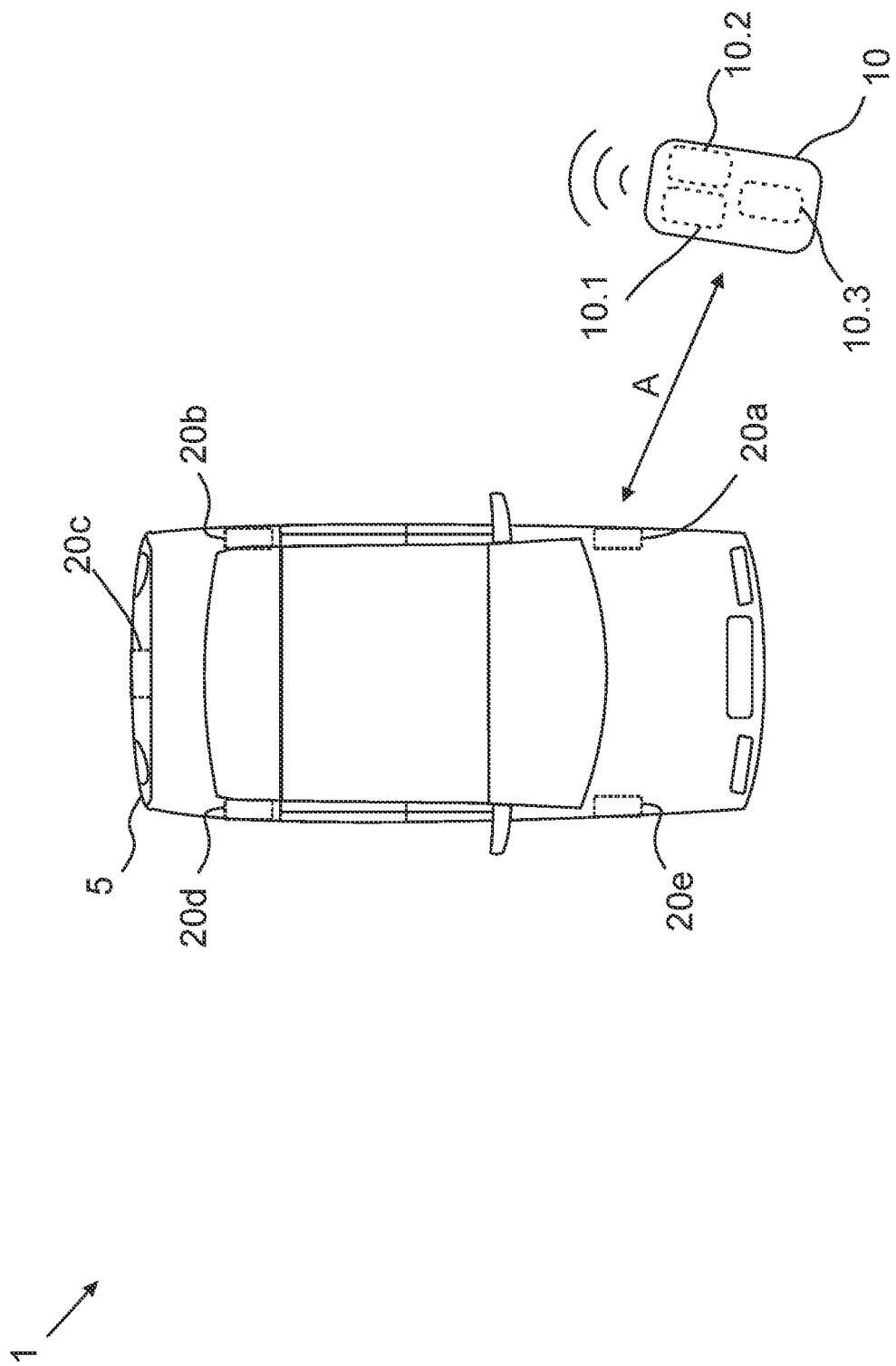

| | | | | |
|---|---|---|---|---|
| 2010/0325425 A1* | 12/2010 | Park | ................... | H04W 12/50 |
| | | | | 713/155 |
| 2015/0100783 A1* | 4/2015 | Gautama | ................ | H04L 9/32 |
| | | | | 713/168 |
| 2016/0231421 A1* | 8/2016 | Murakami | ............ | G01S 11/06 |
| 2019/0023226 A1* | 1/2019 | Heinbockel | .......... | B60R 25/246 |
| 2021/0264705 A1* | 8/2021 | Breer | ................ | H04L 63/0876 |
| 2021/0339754 A1* | 11/2021 | Zhang | ................ | B60W 50/14 |

* cited by examiner

METHOD FOR SECURING A COMMUNICATION BETWEEN A MOBILE COMMUNICATION APPARATUS AND A VEHICLE

The present invention relates to a method for securing a communication between a mobile communication apparatus and a vehicle. Furthermore, the invention relates to a radio module, a communication apparatus and a system with the communication apparatus.

From the prior art it is known to use a challenge-response method for the authentication of a communication participant. This involves a knowledge-based check, i.e. it is checked whether this communication participant as the apparatus to be authenticated knows a certain secret information ("shared secret"). For this purpose, a challenge (engl. challenge) can be set, which the apparatus to be authenticated must solve. The solution can then be transmitted as the "response" to the apparatus that performs the authentication. This apparatus can also solve the challenge independently of the apparatus to be authenticated. If the solutions match, the authentication is successful.

Such a method can also be used for security and access systems of vehicles, for example to secure the communication between a mobile communication apparatus (e.g. an electronic key) and the vehicle.

There are also methods known to perform attacks on such authentication methods. For example, it may be a problem if the communication between the participants and thus the exchange of solutions is intercepted in order to draw conclusions about the shared secret, for example.

It is therefore an object of the present invention to at least partially eliminate the disadvantages described above. In particular, it is an object of the present invention to provide an improved and more secure authentication.

The preceding object is solved by a method with the features of the independent method claim, by a radio module with the features of the independent, secondary device claim, by a communication apparatus with the features of the further independent, secondary device claim as well as by a system with the features of the independent system claim. Further features and details of the invention result from the respective dependent claims, the description and the figures. Features and details described in connection with the method according to the invention are, of course, also valid in connection with the radio module according to the invention, the communication apparatus according to the invention and the system according to the invention, and vice versa, so that with regard to the disclosure of the individual aspects of the invention reference is or can always be made to each other.

The object is solved in particular by a method for securing a communication between a mobile communication apparatus and a vehicle, in particular in the context of authentication and/or distance determination at a passive access system of the vehicle, preferably for securing a distance determination of a distance between the communication apparatus and the vehicle. The mobile communication apparatus can be designed as an electronic key (identification transmitter) for the vehicle or as a mobile radio apparatus, such as a smartphone or the like, to activate a security-relevant function at the vehicle (in particular at the access system).

The security-relevant function is e.g. unlocking or locking of a locking system of the vehicle in order to enable opening or closing of doors and/or a tailgate of the vehicle. This requires in particular that a user is authenticated as authorized. For this purpose, the mobile communication apparatus may be carried by the user and exchange data, e.g. a code or the like, with the vehicle in order to authenticate as authorized. In order to further increase security, it may also be provided to secure the communication for carrying out the data exchange. For this purpose, for example, it is intended that at least one of the communication participants that are involved is authenticated, i.e. that the communication apparatus authenticates the at least one other communication participant involved in the communication. In other words, a mutual authentication of the mobile communication apparatus and the vehicle can be provided. For this purpose, a first authentication can be performed by the mobile communication apparatus so that the mobile communication apparatus can ensure that its communication partner is actually an apparatus of the vehicle and then a second authentication can be performed by the vehicle so that the vehicle authenticates the mobile communication apparatus in order to activate the security-relevant function.

Here it is possible that the vehicle comprises at least one radio unit (in particular as the communication partner for the mobile communication apparatus or as the further communication participant). For example, at least two or at least three or at least four or at least eight radio units are provided on the vehicle in order to provide the most reliable communication possible (e.g. also for different spatial regions and/or directions) and/or a reliable distance measurement of the distance to the communication apparatus. The at least one radio unit can each be designed as a radio unit permanently arranged on the vehicle, preferably as an electronic radio unit, which is optionally electrically connected to a (central) vehicle electronic system.

Advantageously, in a method according to the invention, at least one of the following steps can be carried out, wherein the steps are preferably carried out one after the other or in any order and, if necessary, individual steps can also be repeated:

a) performing a transmission for providing at least one indicator specific challenge information from the mobile communication apparatus to the at least one radio unit of the vehicle (e.g. a transmission message with data specific to the indicator specific challenge information can be transmitted), b) performing a vehicle-side processing of the (provided) indicator specific challenge information, e.g. by a processing unit of the respective radio unit and/or the vehicle, in order to determine an indicator for the radio unit, in particular to calculate it, c) determining an addressing information by the mobile communication apparatus independently of the vehicle-side processing, e.g. by a processing device of the communication apparatus, d) initiating a communication based on the addressing information by the mobile communication apparatus, e.g. by an interface device, in particular a radio interface device, of the communication apparatus, e) performing the communication between the mobile communication apparatus and the radio unit if the addressing information matches the determined (or calculated) indicator.

This provides a particularly reliable means of securing the communication between the vehicle and the mobile communication apparatus. In particular, the described method offers the advantage that the securing (in particular the authentication) does not have to be based, or at least not exclusively, on a conventional exchange of a solution according to a challenge-response method between the radio unit and the communication apparatus. Thus, manipulation of security-relevant information is not or only with difficulty possible, although the data exchange can be monitored by all apparatuses, whether authorized or unauthorized. Nevertheless, the goal can be achieved that the mobile communication apparatus authenticates the radio unit as authorized. This is because the communication is only carried out if the addressing information matches the determined indicator, in particular within a specified time period ΔT for the response. If, for example, this response time period ΔT is exceeded, authentication can also be suspended, even if the correct addressing information matches the determined (or calculated) indicator (after step e)).

The provision of the at least one indicator specific challenge information can be done e.g. by transmitting data like a transmission message according to step a), which are specific for the indicator specific challenge information. If necessary, then still further steps (for the provision and/or for the receipt of the indicator specific challenge information) can be necessary, as for example an evaluation of the data by the radio unit, in order to actually determine or receive the challenge information. It can be provided as a further security mechanism that this evaluation is carried out by means of a secret key, which only the radio unit and/or the communication apparatus comprises. By using different evaluations, it may also be possible to determine at least one further challenge information from the same data. This makes it possible to increase security and at the same time to reduce the data to be transmitted according to step a) (one transmission of a single transmission message then provides e.g. several challenge information).

It is also advantageous if the vehicle-side processing and/or the determination of the addressing information is carried out in such a way that the indicator can be identified or the addressing information can be determined only on the basis of (in particular secret) information (e.g. a "shared secret" or "secret key"). In particular, the secret information is a common information of the mobile communication apparatus and the at least one radio unit or the vehicle, i.e. identical for the radio unit(s) or the vehicle and the communication apparatus. It is also possible that different common secret information are provided for different radio units. In case of a positive match according to step e), the communication apparatus can assume that the radio unit belongs to the vehicle (due to the knowledge of the secret information) and is authorized. It can also be advantageously avoided that conclusions can be drawn about the (secret) information, since the solution of the challenge information as a challenge according to a challenge-response method is not transmitted as a classic response, but the match is checked on the basis of the addressing by means of the addressing information. In other words, there may be no "training opportunity" for learning the encryption or the like, since the radio unit cannot be requested without knowing the (in particular secret) information.

In addition, a method according to the invention can have the advantage of reducing the number of exchanged communication data, in particular telegrams. Preferably, for this purpose, the determined indicator is used and/or processed exclusively within the (respective) radio unit and thus is not transmitted or transmitted separately to the communication apparatus via a communication connection so that it can be evaluated by the communication apparatus. This also reduces the time and energy consumption of the vehicle and/or the mobile communication apparatus. Sufficient time can also be gained for the processing of the communication apparatus, e.g. for the determination of the addressing information, and/or for the processing of the respective radio unit, since the challenge is known early enough.

Furthermore, it has proven to be a particularly effective security measure if the (respective) radio unit uses the determined indicator to specify it as an identifier for an addressing. The identifier is e.g. an address which can be used to address the radio unit and/or to connect to the radio unit. By specifying the identifier, also the address can be the same as that of the indicator with regard to content or can be derived from the indicator. In other words, every radio unit can change its addressing itself. In particular, it can be impossible to address the respective radio unit without knowing the identifier, so that in this case no communication with the radio unit is possible. For example, the respective radio unit rejects a received packet if the addressing information in it does not match the identifier. In this case, the packet is no longer evaluated by the radio unit. The packet is e.g. a data packet which is sent out by the communication apparatus to initiate the communication. The determination and manipulation of security-relevant information is thus very difficult.

It is further advantageous if, according to step d), the initiation of the communication is performed on the basis of the addressing information by the mobile communication apparatus searching for a radio unit whose identifier (e.g. an address) corresponds to the addressing information. This process can be repeated for several radio units also on the basis of further (different, assigned to the radio units) addressing information for the initiation of further communications. E.g. the search can be carried out by making the identifier(s) of the radio unit(s) visible and/or by addressing them by the communication apparatus from the at least one radio unit. It is also conceivable that for the search the communication apparatus sends out the addressing information e.g. by broadcast and/or transmits it to the respective radio unit, and the radio unit compares the addressing information with the identifier, and only in case of a match establishes a communication connection for the communication according to step e). Furthermore, it is conceivable that the addressing information is used by the communication apparatus to encrypt and/or encode the communication signal and/or the data transmitted thereby and the respective radio unit uses its respective identifier to decode and/or decrypt this communication signal or the data.

It may further be provided that the match of the addressing information and the determined indicator according to step e) are determined by the fact that the (respective) radio unit can be successfully addressed by means of the addressing information according to step d).

Optionally it is conceivable that in step a) the indicator specific challenge information is provided by transmitted data, in particular by a single transmission message, from which the indicator specific challenge information (e.g. according to a first evaluation) is determined, and from which likewise at least one further challenge information (e.g. according to a second evaluation) is determined, wherein the further challenge information can differ from the indicator specific challenge information and preferably in step b) a solution information is determined (in particular calculated) by the vehicle-side processing of the further challenge information, wherein preferably the solution information for authentication of the radio unit (in particular by means of the communication according to step e)) is transmitted from the radio unit to the mobile communication apparatus, and is then compared preferably by the mobile communication apparatus with a comparison information in order to confirm the identity of the radio unit by means of the comparison (i.e. to carry out the authentication). This further solution information, which can correspond to a response according to a challenge-response method, provides an additional security factor. A special feature of the method according to the invention can result from the fact that the determined solution information can only be transmitted from the radio unit to the mobile communication apparatus if the communication according to step e) could be successfully established on the basis of the addressing information (and the indicator). In other words, it is necessary that the "first challenge" had to be successfully solved first according to the indicator specific challenge information so that the response of the "second challenge" can be transmitted according to the further challenge information. A manipulation and/or determination of the determined solution information is thus made considerably more difficult, since this is only possible with positive knowledge of the correct addressing information or the correct indicator for the execution of the communication.

Furthermore, it may be advantageous within the scope of the invention that the indicator specific challenge information is a (particularly first) challenge and the determined indicator is a (particularly first) response according to a challenge-response method, and preferably additionally a further challenge information is provided as a further (particularly second) challenge and a solution information is provided as a further (particularly second) response according to a challenge-response method. Preferably, the first and second challenge-response can differ in that only in the second challenge-response the second response is actively transmitted from the (respective) radio unit to the communication apparatus for checking, whereas in the first challenge-response the checking of the first response occurs on the basis of a state of the communication. The check is positive, for example, if the communication can be successfully established and/or continued according to step e) (in particular due to the matching of the addressing information and the indicator). This can significantly increase the security of the authentication. Preferably, however, the required response time period ΔT should be taken into account in order to be able to detect attempts of manipulation.

In the method according to the invention, it may be possible that the transmission message and/or the indicator specific challenge information is specific to or corresponds to a, in particular, secret random number. The random number may be secret, i.e. it may be stored only in the communication apparatus and thus be known to it. It can also be a rolling code, which is known to both the communication apparatus and the vehicle. The indicator specific challenge information is e.g. specific for the random number in that it is calculated from the transmission message and the transmission message corresponds to the random number or comprises it.

The indicator specific challenge information is generated and/or provided and/or encrypted by the mobile communication apparatus e.g. before step a). The transmission (in particular of the transmission message) for providing the indicator specific challenge information at the radio unit according to step a) can subsequently be encrypted and/or can occur by a (in particular first) data transmission to the at least one radio unit. It may also be provided that this data transmission is carried out as a broadcast and can thus be received by all or other radio units.

Furthermore, it is possible that the determination of the indicator according to step b) and/or the determination of the addressing information according to step c) is carried out in each case on the basis of the challenge information and thus on the basis of the same random number. This ensures that the correct indicator can only be determined upon receipt of the indicator specific challenge information and/or successful decryption of the transmitted transmission message by the radio unit so that the addressing information and the indicator are the same.

Furthermore, it is conceivable that the initiation of the communication according to step d) occurs by means of a, in particular second, data transmission of the addressing information, preferably by broadcast to all radio units. This enables a simple and reliable communication, but may have the disadvantage that an unauthorized apparatus (e.g. an unauthorized radio unit that does not know the secret key and/or cannot solve the challenge) intercepts the addressing information transmitted by broadcast. Therefore, the securing of the communication can occur depending on a point in time of the (in particular second) data transmission, preferably depending on a time duration between this (second) data transmission and a further (subsequent, e.g. third) data transmission of the communication. For this purpose, an electronic timer element is used in the communication apparatus, for example, to start a time measurement after transmitting the addressing information according to step d). This enables the measurement of a time duration and/or a signal propagation time measurement until the reception of a further communication message by means of the communication according to step e). It is also conceivable that another time duration (with other triggers) is measured and/or the time duration is (co-)determined by the radio unit. In particular, this time duration is specific for a spatial distance between the communication apparatus and the radio unit, so that this time measurement can also be used for the distance measurement. It can be provided that the communication is only considered as secured if the measured distance falls below a given maximum distance or if the measured time duration (meant: the response time duration ΔT) falls below a given maximum time duration.

It is also advantageous that a time duration (ΔT) between a first data transmission and/or a second data transmission and/or a third data transmission of the communication is determined, and according to step e) the communication is only then continued and/or is considered secured, and/or according to a further step f) the radio unit is only then recognized as authorized and/or a positive authentication occurs only if the time duration is below a given maximum duration.

Furthermore, it is conceivable that the transmission according to step a) is carried out by transmitting (transferring) data from the mobile communication apparatus to the at least one radio unit of the vehicle, wherein the data is specific for the indicator specific challenge information and/or for a further challenge information in such a way that in step b) the indicator specific challenge information and/or the further challenge information is calculated from the data, preferably using a secret key. For example, a telegram or the like is transmitted by means of the data, which comprises, for example, user data and/or control data (such as a checksum or the like). The user data can comprise e.g. a random number from which the indicator specific challenge information and/or the further challenge information can be calculated. For this purpose, processing is performed using a secret key, for example. The same secret key can also be used, for example, to determine the indicator according to step b) and/or to determine a solution information. The random number can, for example, comprise a size of 2 to 32 bytes, preferably 4 to 16 bytes, preferably 8 bytes.

It is advantageous in a method according to the invention that during the transmission according to step a) the indicator specific challenge information and/or the further challenge information is provided by means of exactly one transmission message, preferably a data packet and/or a telegram, wherein preferably the indicator specific challenge information and/or the further challenge information is determined from the transmission message by means of a secret key. In particular, the transmission message is unknown to the radio unit before transmission and/or is based on a random number generated by the communication apparatus, so that, if applicable, the challenge information(s) for the radio unit is/are also unknown before transmission and/or is/are based on the random number.

It is also possible that step a) comprises the transmission as a broadcast and/or step d) comprises the transmission of the addressing information as a broadcast, preferably to undefined radio units.

According to a further advantage, it may be provided that the indicator specific challenge information and/or a further challenge information and/or a transmission message each comprise at least one random number, particularly preferably each comprising a data quantity in the range from 1 byte to 32 bytes, in particular 2 bytes to 16 bytes, preferably exactly 2 or 4 or 8 bytes. For example, at least one random number generator may be provided in the communication apparatus for generating the respective challenge information and/or transmission message. This random number generator may, for example, be part of an electronic processing device, such as a microcontroller or the like. In particular, such a processing device of the communication apparatus is designed to encrypt the respective challenge information according to a respective cryptographic function using a respective secret key ("secret key") in order to further increase security.

Advantageously, the invention may provide that in step b) the processing on the vehicle side comprises:
 the performance of an indicator specific cryptographic function using a secret key in order to determine the indicator, in particular to calculate it cryptographically, and preferably
 a further cryptographic function on the basis of a further secret key in order to determine a solution information, in particular to calculate it cryptographically,
wherein preferably in step c) the addressing information is determined in that the same indicator specific cryptographic function is performed by the mobile communication apparatus on the basis of the secret key, and preferably a comparison information is determined in that the same further cryptographic function is performed by the mobile communication apparatus on the basis of the further secret key. This ensures that the communication apparatus and the vehicle or the respective radio unit arrive at the same solution independently of each other if they have common knowledge of the corresponding secret key. In particular, in case of a positive authentication, the addressing information and the indicator number should match and the solution information and the comparison information should match. For this purpose, the indicator specific cryptographic function and the further cryptographic function can be identical or different. The cryptographic functions each comprise, for example, at least one hash function, at least one encryption algorithm or the like.

According to a beneficial further development of the invention it can be provided that the determination, in particular calculation, of the indicator and/or a solution information by the vehicle (thus also by the respective radio unit) and/or the addressing information and/or a comparison information by the mobile communication apparatus is carried out by means of a cryptographic common secret, which comprises at least one, preferably two different, secret keys. In particular, the common secret can be understood as a fixed term in cryptography ("shared secret"). For example, a first key is provided as an "indicator specific" key for determining the indicator and the addressing information, and/or a second key is provided as a "further key" for determining (calculating) the solution information and the comparison information. In order to reliably provide the at least one key for a cryptographic function, this key can be stored, preferably encrypted, in a memory unit of the radio unit and/or in a memory device of the communication apparatus.

Furthermore, it may be provided within the scope of the invention that the communication according to step e) is performed to determine a spatial distance between the mobile communication apparatus and the (at least one) radio unit, preferably by a time-of-flight analysis. In this context, it is advantageous if several radio units of the vehicle are used for distance determination in order to increase the accuracy of the determination. In particular, this distance determination can be used to determine security-relevant information in order to decide whether the communication apparatus can be positively authenticated by the vehicle to activate a security-relevant function of the vehicle and/or vice versa the vehicle or the radio unit of the vehicle can be positively authenticated by the communication apparatus. If, for example, a signal is intercepted during communication or the initiation of communication, e.g. by another apparatus, a delay of communication occurs, which can be detected during the distance determination.

It is advantageous in the method according to the invention that the communication (according to step e), in particular only if the addressing information and the determined indicator match, provides a distance determination based on the communication, whereby a distance information about a distance between the communication apparatus and the vehicle is determined. The distance determination can be performed e.g. by evaluating a signal strength of a communication signal of the communication.

The distance determination can be particularly reliable and/or safe and/or accurate if several communications are carried out between the mobile communication apparatus and several radio units, e.g. a first communication with a first radio unit and a second communication with a second radio unit etc. In this case, an evaluation of the respective communication signals can be performed for each communication, e.g. by means of signal strength and/or a time-of-flight analysis, in order to determine the distance information about the distance between the communication apparatus and the vehicle on the basis of all evaluations.

It may be possible that according to a step f) the distance information is compared with a maximum distance, so that the communication apparatus and/or radio unit is only positively authenticated by the vehicle or the communication apparatus if the distance between the communication apparatus and the vehicle does not exceed this maximum distance. Only in this case a security-relevant function of the vehicle can be activated. This ensures that, for example, no relay station attack leads to the activation of the security-relevant function.

For example, the vehicle is designed as a motor vehicle and/or as a passenger vehicle and/or as a truck and/or as an electric vehicle and/or as a hybrid vehicle and/or as a self-propelled vehicle, preferably with a passive access system and/or a keyless-go system.

Optionally, it may be provided that the transmission according to step a) and/or the communication according to steps d) and e) is performed by ultra-wideband (UWB), so that the at least one radio unit is designed as a UWB radio unit in each case. Furthermore, the communication apparatus for carrying out the communication according to step d) and e) and/or for the transmission according to step a) can comprise an interface device which is designed, for example, as a UWB interface. If necessary, a bandwidth of at least 500 MHz and/or at least one frequency in the range from 1.6 GHz to 10.6 GHz can be used. This can make it even more difficult to determine and/or manipulate the security-relevant information. It is also possible that the determination of the distance is carried out by means of UWB communication (this is also referred to as "UWB ranging"), which makes it much more difficult to manipulate the distance information.

Preferably, it may be provided within the scope of the invention that the transmission according to step a) is carried out as a broadcast to undefined radio units of the vehicle (i.e. in particular without concrete addressing information and/or connectionless to all radio units ready to receive), so that the indicator specific challenge information (and in particular also the further challenge information) is received by several radio units of the vehicle and is thus preferably designed as a common basis for determining different respective indicators by respective vehicle-side processing of respective radio units. In other words, a single indicator specific challenge information and/or a single further challenge information can be provided to all radio units (in the same way) and/or received identically there, and if necessary processed by a vehicle-side processing in order to determine a respective indicator and/or a respective solution information. The thereby determined, in particular calculated, indicators and/or solution information differ from each other, since the respective processing is carried out on the basis of at least one key information (i.e. e.g. a secret key), which is different for different radio units, wherein preferably all key information is stored in the communication apparatus and/or is known by the communication apparatus in order to authenticate the radio units. This has the advantage that also different indicators for different radio units are determined, which can be used as an identifier for the addressing to initiate the communication. It may therefore also be possible that the respective vehicle-side processing for different radio units is carried out using the same indicator specific challenge information, and preferably also the same further challenge information, and only the key information for the processing differs, so that the processing delivers different results. In particular, all processing results would otherwise be identical with the same key information, since it is advantageous for the vehicle-side processing to comprise (exclusively) the key information and the challenge information as input parameters.

It is also advantageous if at least 5 or at least 10 or at least 20 different key information for different radio units are stored in the communication apparatus. Key information can also be stored "quasi on stock" in the communication apparatus in order to flexibly address several radio units in the vehicle. This is because the number of radio units on the vehicle is not necessarily known in advance and can depend on the vehicle geometry. In this way, flexible integration is also possible for different vehicles and/or access systems.

Furthermore, it is optionally provided that according to step b) different vehicle-side processing operations are performed for different radio units, which are each performed on the basis of the same indicator specific challenge information, and preferably also the same further challenge information, so that different indicators for the different radio units are determined by performing the processing operations using different radio unit specific information, in particular secret keys.

It can be possible, that the determined indicator is used by the (respective) radio unit to define a (respective) indicator, which is used for addressing to establish a communication with the (respective) radio unit. This identifier can be understood as a so-called service set identifier (SSID). It is conceivable that the identifier is visible or hidden to the outside. For example, security can be increased if a communication apparatus cannot retrieve or receive the specified identifier, but must actively address the radio unit using the addressing information. Furthermore, this addressing information can also be encrypted and/or cryptographically protected to initiate communication with the radio unit. It is conceivable that only then the communication and/or the request of a (respective) radio unit is possible, if the addressing information matches the identifier, in order to ensure security during communication.

Furthermore, it is optionally possible within the scope of the invention that several radio units are provided on the vehicle, each of which comprises a changeable identifier for addressing during the communication according to steps d) and e), which is preferably cryptographically formed by the determined indicator. In particular, at least one cryptographic function for the vehicle-side processing can be used for this purpose, which is designed to determine a (unique) indicator using the indicator specific challenge information and a radio unit specific key information. The function is preferably designed to ensure that the determined indicators of different radio units are guaranteed to differ from each other.

It may preferably be provided that a performance of at least one of steps a) to e) is initiated when an initiation signal, preferably via LF radio communication, is received by the communication apparatus, in particular as an ID transmitter. (LF stands for low frequency.) This can be e.g. a wake-up signal to detect the approach of the communication apparatus to the vehicle. This is in particular useful for a passive (passive entry) access system of the vehicle, since the authentication of the communication apparatus and/or an activation of a security-relevant function of the vehicle is carried out automatically at the communication apparatus, if necessary without active operation, at the approach. Furthermore, it may be possible that an HF signal (HF stands for high frequency) is transmitted by the communication apparatus in response to the receipt of the initiation signal.

Furthermore, it may be possible that the transmission according to step a) and/or the communication according to steps d) and e) is carried out by at least one of the following communication technologies:

LF,
HF,
WLAN (wireless local area network),
Bluetooth,
Bluetooth Low Energy,
NFC (near field communication),
RFID (radio frequency identification),
mobile radio.

Also subject of the invention is a radio module, comprising:
    a transceiver for receiving a transmission message specific for the indicator specific challenge information from a mobile communication apparatus via radio, preferably via ultra-wideband, an electronic processing unit to perform a vehicle-side processing of the indicator specific challenge information to determine an indicator for the radio module.

Here it is intended that the processing unit is designed to set the indicator as an identifier for an addressing of the radio module when communicating with the mobile communication apparatus. The addressing can be absolutely necessary on the basis of the identifier, in order to establish a communication connection (of the communication apparatus) with the radio module. For example, an addressing information must be transmitted to the radio module for this purpose, whereby the radio module only establishes the communication connection if the addressing information and the determined indicator and/or the identifier match. It is also possible that the set identifier is visible to the communication apparatus and the communication apparatus establishes the communication connection only with the radio module whose identifier corresponds to the addressing information. It is also possible that the processing unit is also designed to calculate the indicator specific challenge information from the transmission message.

Thus, the radio module according to the invention comprises the same advantages, as described in detail with reference to a method according to the invention. In addition, the radio module may be suitable to be operated according to a method according to the invention. Another possibility may be that the radio module according to the invention is designed as a radio unit according to a method according to the invention.

Furthermore, it may be provided within the scope of the invention that the processing unit is electrically connected to an electronic memory unit in order to read out a (cryptographic and/or digitally stored) key information from the memory unit for carrying out the vehicle-side processing, wherein preferably the key information is cryptographically secret and uniquely assigned to the radio module. This ensures that only the radio module can know the key information, and this knowledge can therefore serve as proof of authorization for authentication.

Also subject of the invention is a communication apparatus (preferably an ID transmitter) for authentication at a vehicle, comprising:

an electronic memory device which has stored at least one (in particular cryptographically secret) key information for authentication of at least one radio unit of the vehicle, an electronic processing device, which is electrically connected to the memory device and is designed to cryptographically determine, preferably to calculate, at least one addressing information for addressing the at least one radio unit by means of the at least one key information.

Thus, the communication apparatus according to the invention comprises the same advantages as they have been described in detail with respect to a method and/or radio module according to the invention. In addition, the communication apparatus may be suitable to be operated according to a method according to the invention.

Also subject of the invention is a system, comprising:
a communication apparatus according to the invention,
at least one radio module according to the invention, which in each case forms the radio unit.

In particular, it is intended that the system is designed to perform a method according to the invention. Thus, the inventive system comprises the same advantages as they have been described in detail with respect to a method according to the invention.

Figure 2:
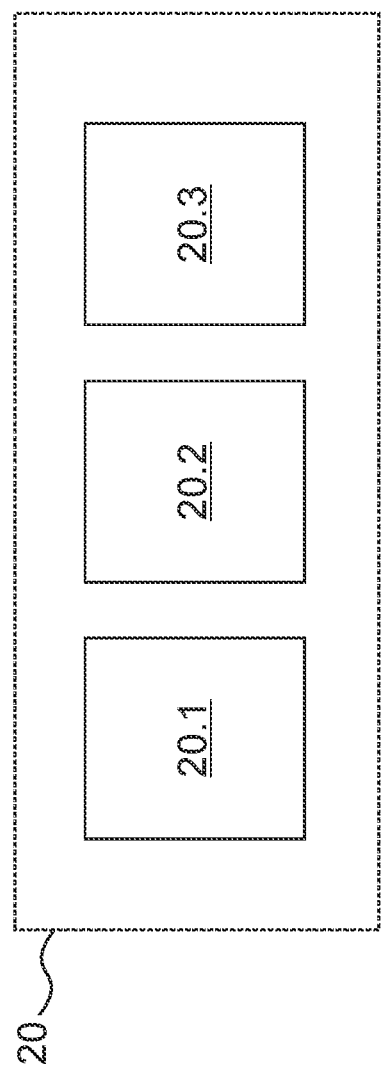
Figure 3:
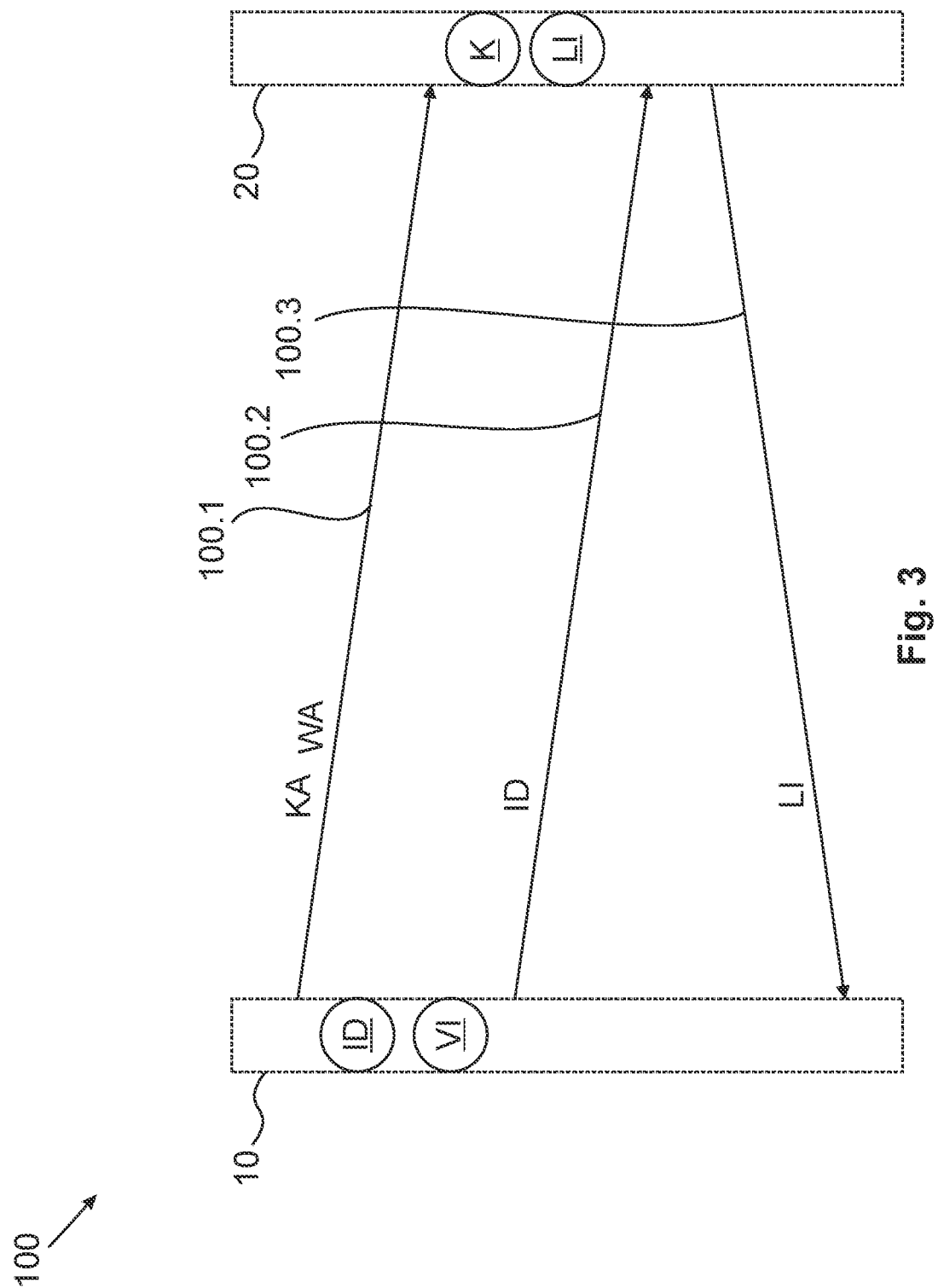

Further advantages, features and details of the invention result from the following description in which, with reference to the figures, embodiments of the invention are described in detail. The features mentioned in the claims and in the description may be individually or in any combination essential to the invention. The figures show:

FIG. 1 a schematic top view of a vehicle with a system according to the invention, FIG. 2 a schematic representation of a radio module according to the invention, FIG. 3 a visualization of a method according to the invention.

In the following figures, the identical reference signs are used for the same technical features even from different embodiments.

FIG. 1 schematically shows a system 1 according to the invention and a vehicle 5 in a top view. The vehicle 5 may comprise several radio units 20, in particular radio modules 20. As an example, five radio units 20 are shown, wherein a first and second radio unit 20a, 20b are arranged on the left side of the vehicle, a third radio unit 20c in the rear region and a fourth and fifth radio unit 20d, 20e on the right side of the vehicle. This makes it possible to communicate with a mobile communication apparatus 10 particularly reliably from different directions.

The radio units 20 can be part of a passive entry system of the vehicle 5, which makes it possible to unlock a locking device of the vehicle 5 without active manual actuation of an ID transmitter. According to the embodiment shown, it may be sufficient for the unlocking of the locking device that the mobile communication apparatus 10 as ID transmitter 10 gets close to the vehicle. However, it is presupposed that a successful authentication with the ID transmitter 10 is carried out and a distance A between the ID transmitter 10 and the vehicle 5 is within a maximum distance. A method 100 according to the invention can make a decisive contribution to ensuring these conditions, and in particular to cryptographic securing.

When approaching the vehicle 5, it may first be intended that the mobile communication apparatus 10 (i.e. the ID transmitter) receives a radio signal from the vehicle 5, e.g. an LF (low frequency) radio signal. This can trigger an authentication process and the so-called "ranging", i.e. the distance determination of the distance A. It is advantageous, if the distance determination is carried out by means of a communication, e.g. by the detection of a signal strength or a determination of a signal propagation time (time-of-flight analysis). It is shown that the mobile communication apparatus 10 comprises at least one interface device 10.1 for performing the communication, which is designed for example as a radio interface, preferably an ultra-wideband interface. Also further interfaces, e.g. a LF radio interface, can be integrated into the communication apparatus 10. At least one processing device 10.3 is provided for cryptographic processing, e.g. an integrated circuit, a microcontroller or the like. For the storage of cryptographic information in particular, a memory device 10.2 is provided, which is designed for the persistent storage of data.

For the performance of the method 100 according to the invention, it is particularly useful if both the mobile communication apparatus 10 and the respective radio unit 20 (i.e. the radio module 20) can perform at least one cryptographic function using at least one key information. Therefore, also the respective radio unit 20 accordingly comprises suitable components. In FIG. 2 it is shown schematically that the radio unit 20 and/or the radio module 20 according to invention can comprise at least one processing unit 20.3, which can be connected with a memory unit 20.2. In addition, a suitable transceiver 20.1 is provided for communication with the communication apparatus 10. This is also designed for radio communication via ultra-wideband (UWB).

FIG. 3 schematically visualizes the method 100 according to the invention with further details. For this purpose, a temporal sequence of three transmission processes 100.1, 100.2 and 100.3 is shown, which occur one after the other between a (single) mobile communication apparatus 10 and, exemplarily, a radio unit 20. The radio unit 20 is representative for all radio units 20 of the vehicle 5. The communication apparatus 10 is designed separately from the vehicle 5, so that the transmission occurs e.g. via radio, in particular via UWB. Exemplary embodiments of the communication apparatus 10 are a smartphone or an electronic key for the vehicle 5, which can be used for authentication at the vehicle 5 and thus as an ID transmitter. In other words, the communication apparatus 10 is used for authentication at the vehicle 5, i.e. to prove the authorization to activate a security-relevant vehicle function. Such a function is for example an opening of the tailgate and/or an unlocking of a locking device of the vehicle 5. Various methods are known for authentication, e.g. the transmission of a code from the ID transmitter 10 to the vehicle 5, in particular via UWB communication between the ID transmitter 10 and the radio unit 20, wherein the code can then be transmitted to the vehicle electronic system to complete the authentication. The following describes a method to secure such a communication, which is used e.g. for the authentication of the ID transmitter 10 on the vehicle 5.

In principle, the communication apparatus 10 used as an ID transmitter in the vehicle 5 can be authenticated by exchanging data with a radio interface, in this case a radio unit 20, of the vehicle 5. With regard to the securing of this communication, it makes sense to ensure before authentication of the ID transmitter that the radio unit 20 is authorized to perform the authentication. In other words, a further authentication of the radio unit 20 must be carried out at the communication apparatus 10. In this way it can be prevented that an unauthorized code request is made. It may be possible that this further authentication is performed by means of a challenge-response method. The method according to the invention offers an even more extensive securing, since also an unauthorized determination and if necessary a manipulation of this further authentication of the radio unit 20 is at least made more difficult.

In a first step, a first transmission 100.1, in particular a first data transmission 100.1, can be carried out from the mobile communication apparatus 10 to the radio unit 20 to provide at least one indicator specific challenge information KA. This can be a broadcast, so that the indicator specific challenge information KA is provided to undefined radio units 20 of the vehicle 5 (i.e. without concrete addressing). In addition to the indicator specific challenge information KA, at least one further challenge information WA can also be provided by the mobile communication apparatus 10 to the radio unit 20, if necessary also as a broadcast to all radio units 20 of the vehicle 5. Both the indicator specific challenge information KA and the at least one further challenge information WA can also be provided together by transmitting a single data packet. In other words, the indicator specific challenge information KA and the at least one further challenge information WA can be based on the same data set, e.g. a transmission message. During the transmission according to step a), it may not be possible to distinguish between the challenge information KA, WA. In order to determine the differing challenge information KA, WA from this, both the indicator specific challenge information KA and the further challenge information WA can be calculated (e.g. by the radio unit) from the same data package according to different processing methods. The indicator specific challenge information KA is e.g. an "ID challenge" concerning an indicator of the radio unit 20. The further challenge information WA is e.g. a challenge in the context of a challenge-response method for the authentication of the radio unit 20. For example, the challenge information KA and/or WA comprises at least a 2 byte or 4 byte random number sequence. Transmission thus requires that a basis (such as the transmission message) for the respective challenge information has been determined beforehand, e.g. by a random number generator of the communication apparatus 10. Furthermore, it is inherent to the transmission via broadcast that the transmission message is the same for all recipients, i.e. the respective radio units 20.

After this first transmission 100.1 for providing the challenge information KA or WA, the preparation for a second transmission 100.2, in particular a second data transmission 100.2, is carried out. For this purpose, a vehicle-side processing is carried out which can be provided e.g. by the respective radio unit 20 (e.g. by a respective processing unit 20.3) and/or by a vehicle electronic system. At least one associated key information is used for each radio unit 20. For example, a (first) secret key and preferably another secret key can be used for each radio unit 20. Preferably the (first) secret key and/or the further secret key are stored in a non-volatile memory unit 20.2 of a respective radio unit 20. The (first or further) keys of different radio units 20 can be different or identical. Each radio unit 20 then executes a cryptographic function on the basis of the provided (i.e. received) challenge information KA and/or WA and on the basis of the key information in order to determine, in particular to calculate, an indicator K and in particular also a solution information LI.

For example, the cryptographic function is an encryption. In this case, the indicator specific challenge information KA is encrypted using the (first) key during the vehicle-side processing in order to determine an indicator K, in particular to calculate it. This determination (calculation) is performed by all radio units 20 which have received the indicator specific challenge information KA. The determined indicators K differ from each other, e.g. because the keys are different. Also, in the case of the vehicle-side processing, the further challenge information WA can be encrypted using the (first) key or another key in order to determine, in particular to calculate, a solution information LI. This determination (calculation) can also be performed by all radio units 20 which have received the further challenge information WA. Here, too, the determined solution information LI can differ from each other.

It is therefore advantageous if the determined indicators K and/or the determined solution information LI of different radio units 20 (and thus different processing operations) differ from each other. This can be ensured by the fact that, as mentioned, the key information differ and/or another parameter of the cryptographic function differs.

It may be of particular importance that the processing strategy and all information necessary for determining the indicator K or the solution information LI, i.e. the concrete cryptographic function, such as the encryption algorithm or a hash function, and the parameters for the determination (calculation), are known to the communication apparatus 10 for all authorized radio units 20 of the vehicle 5. For example, every secret key of the radio units 20 can be stored in the communication apparatus 10, e.g. in a memory device 10.2. In the sense of a challenge-response method, the communication apparatus 10 can then carry out a similar determination (in particular calculation) independently of the radio units 20 and the respective processing operations. A result of such a determination (or calculation) based on the indicator specific challenge information KA is referred to as addressing information ID in the following, and a result of such a determination (or calculation) based on the further challenge information WA is referred to as comparison information VI in the following.

In order to remain with the example of the encryption as a cryptographic function, the communication apparatus 10 can also encrypt the indicator specific challenge information KA using the (first) key, independent of the vehicle-side processing, in order to determine an addressing information ID, in particular to calculate it (which corresponds to the content of the indicator K determined on the vehicle-side, if necessary). This determination (or calculation) can be performed by the communication apparatus 10 for all authorized radio units 20, i.e. with the corresponding different keys and/or parameters of these radio units 20. The thereby determined (calculated) addressing information ID thus differ from each other, e.g. because the keys for different radio units 20 are different. Also with this communication apparatus-side determination (or calculation) the further challenge information WA can be encrypted on the basis of the (first) key or a further key for respective radio units 20, in order to determine a respective comparison information VI (corresponding to the solution information LI), in particular to calculate it. This determination (or calculation) can also be performed for all authorized radio units 20. Here, too, the determined solution information LI can differ from each other. If the results of the determination (or calculation) of the communication apparatus 10 and the respective radio unit 20 are identical, the radio unit 20 could be successfully authenticated.

In order to determine that the authentication of the radio unit 20 was successful, a special method according to the second transmission 100.2 is provided. Conventionally, in the challenge-response method, the result, i.e. the determined indicator K, would be transmitted from the radio unit 20 to the communication apparatus 10. This would normally enable the communication apparatus 10 to check whether the radio unit 20 has reached the correct result, i.e. whether it is authorized. According to invention, however, such a data transmission can be omitted. For this purpose, the respective radio unit 20 uses the respectively determined indicator K to define an identifier by which the respective radio unit 20 can be specifically addressed during a communication. In the simplest case, the determined indicator K can correspond to the identifier. In the second transmission 100.2, the communication apparatus 10 initiates a communication with a respective radio unit 20 via a respective addressing information ID. In the case of a positive authentication this corresponds to the respective indicator K. In this way, the communication apparatus 10 addresses all radio units 20 if necessary, via a broadcast, but further communication according to step e) is only initiated for those radio units 20 which have set themselves the "correct" identifier corresponding to the addressing information ID. A transmission to other unauthorized radio units 20 may take place (via broadcast), but the communication is not initiated, so that an unauthorized interception can be prevented, since only an authorized answer can be given fast enough in contrast to unauthorized answers.

Subsequently, a third transmission 100.3, in particular a third data transmission 100.3, from the radio unit 20 to the communication apparatus 10 can be used to perform a runtime analysis for the distance determination of the distance A. In order to further increase security, the solution information LI of a respective radio unit 20 can be transmitted to the communication apparatus 10. The latter can compare the respective solution information LI with the respective comparison information VI in order to also check the authorization.

Between a first transmission 100.1 and a second transmission 100.2 there can be e.g. 2 ms, so that there is enough time for the radio unit 20 or the communication apparatus 10 to perform the determinations (or calculations). The time between a second transmission 100.2 and a third transmission 100.3 is e.g. 700 µs, and depends mainly on the distance A. Accordingly, the time duration between the first and second transmission 100.2, 100.3 can be used to determine the distance A.

The above explanation of the embodiments describes the present invention exclusively in the context of examples. Of course, individual features of the embodiments can be freely combined with each other, if technically reasonable, without leaving the scope of the present invention.

LIST OF REFERENCE SIGNS

1 system
5 vehicle
10 communication apparatus, ID-transmitter
10.1 interface device
10.2 memory device
10.3 processing device
20 radio unit, UWB module
20.1 transceiver, radio interface
20d fourth radio unit
20e fifth radio unit
20.2 memory unit
20.3 processing unit
20a first radio unit
20b second radio unit
20c third radio unit
100 method
100.1 first transmission
100.2 second transmission
100.3 third transmission
A distance
ID addressing information
K indicator
KA indicator specific challenge information
LI solution information
VI comparison information
WA further challenge information

The invention claimed is:

1. A method for securing a communication between a mobile communication apparatus and a vehicle, wherein the vehicle comprises at least one radio unit, wherein the method comprises the following steps:
   a) performing a transmission for providing at least one indicator specific challenge information from the mobile communication apparatus to the at least one radio unit of the vehicle, b) performing a vehicle-side processing of the indicator specific challenge information in order to determine an indicator for the radio unit,
c) determining an addressing information by the mobile communication apparatus independently of the vehicle-side processing,
d) initiating a communication based on the addressing information by the mobile communication apparatus, and
e) performing the communication between the mobile communication apparatus and the radio unit if the addressing information matches the determined indicator.

2. The method according to claim 1,
wherein
in step a) the indicator specific challenge information is provided by the transmission of data from which the indicator specific challenge information is determined, and from which likewise a further challenge information is determined, wherein the further challenge information differs from the indicator specific challenge information, and in step b) a solution information is determined by the vehicle-side processing of the further challenge information, wherein the solution information for authentication of the radio unit by means of the communication according to step e) is transmitted from the radio unit to the mobile communication apparatus, and is then compared with a comparison information in order to confirm the identity of the radio unit on the basis of the comparison.

3. The method according to claim 1,
wherein
the indicator specific challenge information is a challenge and the determined indicator is a response according to a challenge-response method.

4. The method according to claim 1,
wherein
the indicator specific challenge information is specific to a random number.

5. The method according to claim 1,
wherein
the initiation of the communication according to step d) occurs by means of a data transmission of the addressing information, wherein the securing of the communication occurs depending on a point in time of this data transmission.

6. The method according to claim 1,
wherein
the transmission according to step a) is carried out by transmitting data from the mobile communication apparatus to the at least one radio unit of the vehicle, wherein the data is specific at least for the indicator specific challenge information or for a further challenge information in such a way that, in step b) at least the indicator specific challenge information or the further challenge information is calculated from the data.

7. The method according to claim 1,
wherein
during the transmission according to step a), at least the indicator specific challenge information or the further challenge information is provided by means of exactly one transmission message.

8. The method according to claim 1,
wherein
at least step a) comprises the transmission as a broadcast or step d) comprises the transmission of the addressing information as a broadcast.

9. The method according to claim 1,
wherein
at least the indicator specific challenge information or a further challenge information or a transmission message each comprise at least one random number.

10. The method according to claim 1,
wherein
in step b), the processing on the vehicle side comprises the performance of an indicator specific cryptographic function using a secret key in order to determine the indicator, and in step c) the addressing information is determined in that the indicator specific cryptographic function is performed by the mobile communication apparatus on the basis of the secret key.

11. The method according to claim 1,
wherein
the determination of at least the indicator or a solution information by the vehicle or the addressing information or a comparison information by the mobile communication apparatus is carried out by means of a cryptographic common secret, which comprises at least one secret key.

12. The method according to claim 1,
wherein
the communication according to step e) is performed to determine a spatial distance between the mobile communication apparatus and the radio unit.

13. The method according to claim 1,
wherein
at least the transmission according to step a) or the communication according to steps d) and e) is performed by ultra-wideband, so that the at least one radio unit is designed as an UWB radio unit in each case.

14. The method according to claim 1,
wherein
the transmission according to step a) is carried out as a broadcast to undefined radio units of the vehicle, so that the indicator specific challenge information is received by several radio units of the vehicle and is thus designed as a common basis for determining different respective indicators by respective vehicle-side processing of respective radio units.

15. The method according to claim 1,
wherein
according to step b), different vehicle-side processing operations are performed for different radio units, which are each performed on the basis of the same indicator specific challenge information, so that different indicators for the different radio units are determined by performing the processing operations using different radio unit specific information.

16. The method according to claim 1,
wherein
several radio units are provided on the vehicle, each of which comprises a changeable identifier for addressing during the communication according to steps d) and e).

17. The method according to claim 1,
wherein
a performance of at least one of steps a) to e) is initiated when an initiation signal is received by the communication apparatus.

18. A radio module, comprising:
a transceiver for receiving a transmission message specific for an indicator specific challenge information from a mobile communication apparatus via radio, and
an electronic processing unit to perform a vehicle-side processing of the indicator specific challenge information to determine an indicator for the radio module, wherein the processing unit is designed to set the indicator as an identifier for an addressing of the radio module when communicating with the mobile communication apparatus.

19. The radio module according to claim 18, wherein
the processing unit is electrically connected to an electronic memory unit in order to read out key information from the memory unit for carrying out the vehicle-side processing, wherein the key information is cryptographically secret and uniquely assigned to the radio module.

20. A communication apparatus for authentication at a vehicle, comprising:
an electronic memory device which has stored at least one key information for authentication of at least one radio unit of the vehicle, and
an electronic processing device, which is electrically connected to the memory device and is designed to cryptographically determine at least one addressing information for addressing the at least one radio unit by means of the at least one key information.

* * * * *